United States Patent [19]
Yang

[11] Patent Number: 5,468,005
[45] Date of Patent: Nov. 21, 1995

[54] FOLDABLE CART

[75] Inventor: Ching S. Yang, Tainan, Taiwan

[73] Assignee: Goonng Chyii Industrial Co., Ltd., Tainan Hsien, Taiwan

[21] Appl. No.: 270,373

[22] Filed: Jul. 5, 1994

[51] Int. Cl.$^6$ .................................................. B62B 1/04
[52] U.S. Cl. ........................ 280/40; 280/655; 280/47.29
[58] Field of Search ............................ 280/40, 651, 652, 280/655.1, 655, 47.24, 47.27, 47.29

[56] References Cited

U.S. PATENT DOCUMENTS

| | | | |
|---|---|---|---|
| 4,335,895 | 6/1982 | Walker | 280/40 |
| 4,917,392 | 4/1990 | Ambasz | 280/40 |
| 5,072,958 | 12/1991 | Young | 280/40 |
| 5,127,662 | 7/1992 | Spak | 280/40 |
| 5,263,727 | 11/1993 | Libit et al. | 280/40 |

Primary Examiner—Richard M. Camby
Attorney, Agent, or Firm—Morton J. Rosenberg; David I. Klein

[57] ABSTRACT

A foldable cart comprises a handle, a pair of wheels pivotally mounted to the bottom respective ends of the handle, and a loading platform at the bottom of the cart in an opposite direction with respect to the wheels. The loading platform has a pair of conical gears at the rear respective ends adapted to engage with a pair of crown gears located at the bottom ends of the wheel frames to adjust the position of the loading platform with respect to the cart.

1 Claim, 8 Drawing Sheets

5,468,005

FOLDABLE CART

FIELD OF THE INVENTION

This invention relates to a foldable cart, and more particularly to a cart having gears meshed together to expend or to fold a loading platform easily.

BACKGROUND OF THE PRIOR ART

The cart currently being used by people to carry cargo, as shown in FIGS. 7 and 8, comprises a pair of wheel frames A connected to the respective bottom ends of the frame and to a pair of brackets C which then connected to a loading platform B. Each wheel frame A has a sleeve A1 at one side having a block A11. The loading platform B is composed of a pair of connecting troughs B1 at respective rear ends. Each trough B1 has a groove B11 at rear end adapted to receive a protuberance C1 of the bracket C to positioning the loading platform B at place. A pair of bracelets D are located on top of the sleeve A1 and has a block D1 at one side facing the same direction of the block A11. A buckle E is adapted to slide into the block A11 and the block D1 to hold the frame of the cart and the loading platform B in a fixed position.

This cart has a foldable loading platform, however, the prior art employees too many parts which increase the cost and which is too complicate to operate.

SUMMARY OF THE INVENTION

It is the primary object of the present invention to provide a foldable cart which has less parts that lower the cost down.

It is another object of the present invention to provide a foldable cart which is easy to operate.

It is a further object of the present invention to provide a foldable cart which has a compact size to store.

DETAILED DESCRIPTION OF THE PREFERRED EMBODIMENT

Reference is now made to the drawings wherein the showings are for the purpose of illustrating a preferred embodiment only and not for the purpose of limiting the inventive concept.

Figure 1:
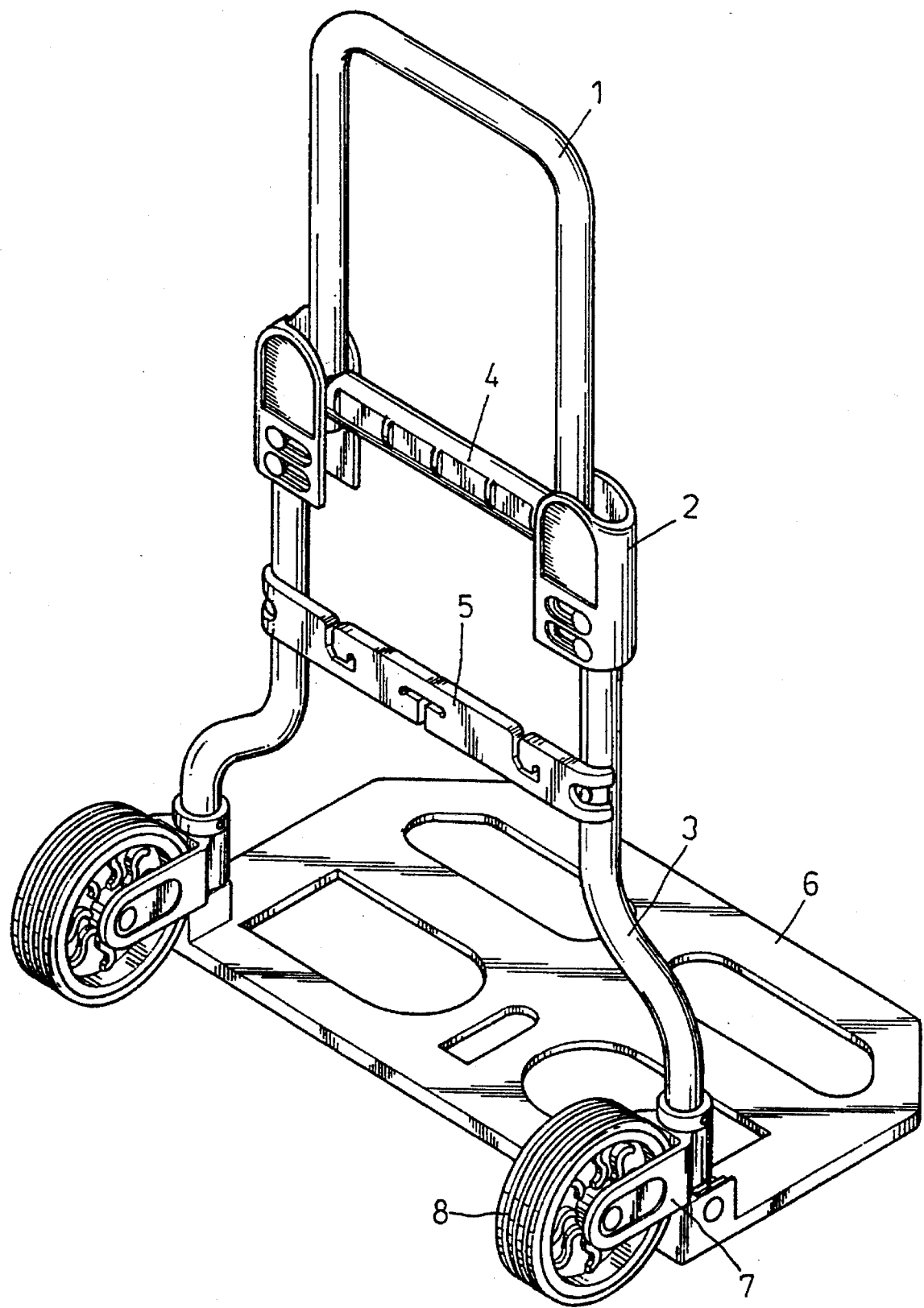
FIG. 1 is a perspective view of a foldable cart in accordance with the present invention.
Figure 2:
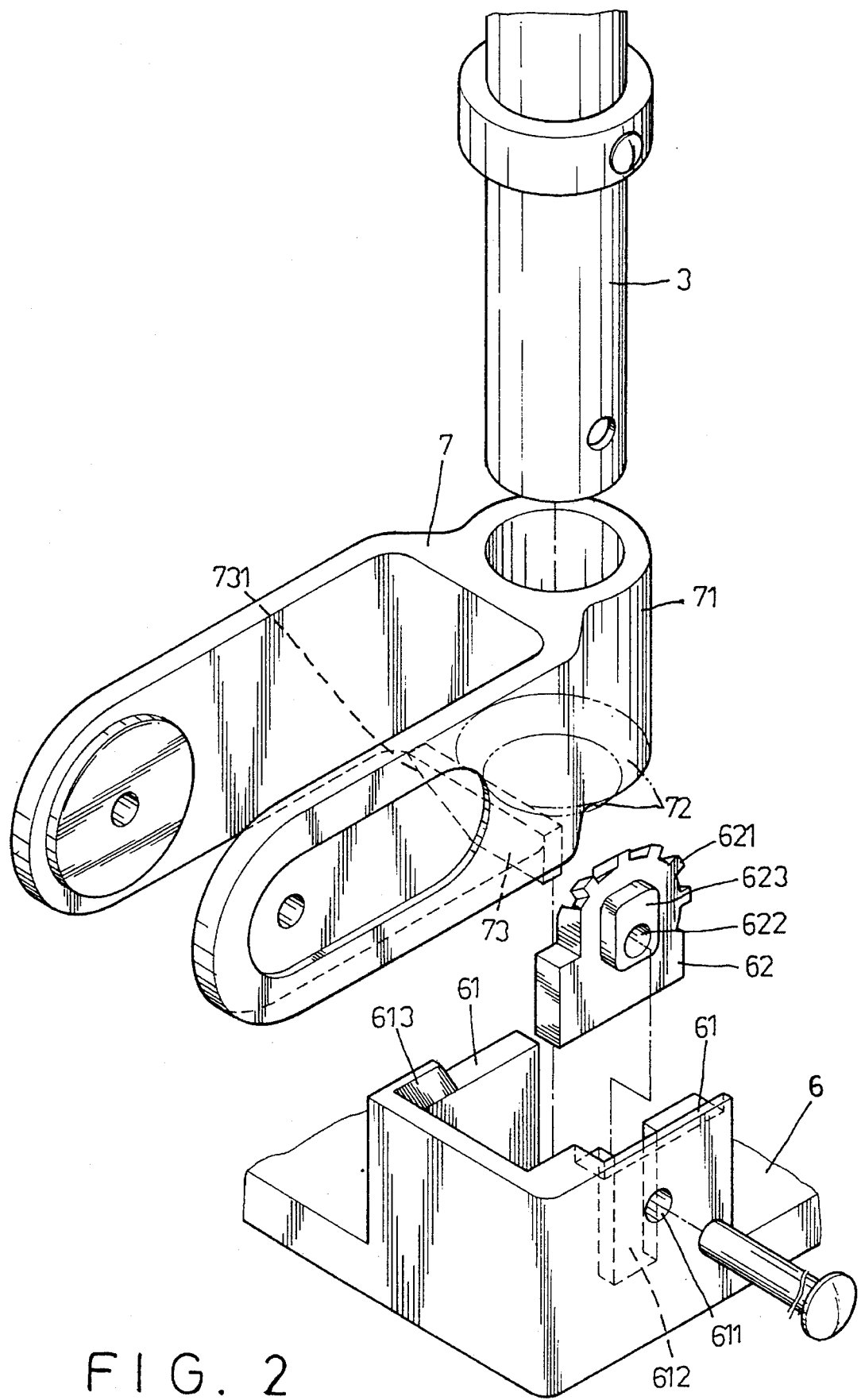
FIG. 2 is an exploded view of a wheel frame, and a fixturing housing of a loading platform according to FIG. 1.

The cart, as shown in FIGS. 1 and 2, is composed of a handle 1, a pair of legs 3, a loading platform 6 and a pair of wheel frames 7.

The handle 1 has its respective ends turned 90 degree downwardly and a horizontal bar 4 connected to the respective inner ends. The respective ends of the handle 1 are pivotally connected to the top portions of the pair of legs 3, respectively. The legs 3 have a horizontal pillar 5 connected thereto to enhance the structure. The joint areas of the handle 1 and the legs 3 are connected to a pair of U-shaped members 2 to confine the movement of the handle 1 with respect to the legs 3. The bottom portions of the legs 3 are inserted into a pair of sleeves 71 at one side of the wheel frames 7, respectively. The sleeve 71 has a crown gear 72 at its bottom portion. Each wheel frame 7 has a block 73 extending downwardly from bottom portion thereof having a slanted flank 731 at one side of the block 73 adapted to position the loading platform 6 at place.

The loading platform 6 comprises a pair of integral fixturing housings 61 at respective rear corners. Each fixturing housing 61, adapted to receive a guiding block 62, includes an aperture 611 formed through the outer wall and a rectangular recess 612 formed in an inside surface of the outer side wall and a bulge portion 613 formed at the top of an inner wall of the fixturing housing. The guiding block 62 has a plurality of conical gear teeth 621 at top, a boss 623 projecting from one side and having an aperture 622 formed concentric with respect to the guiding block 62. The boss 623 is adapted to slide into the recess 612 to hold the guiding block 62 firmly in the fixturing housing 61. The aperture 622 aligns with the aperture 611 of the fixturing housing 6.

Figure 3:
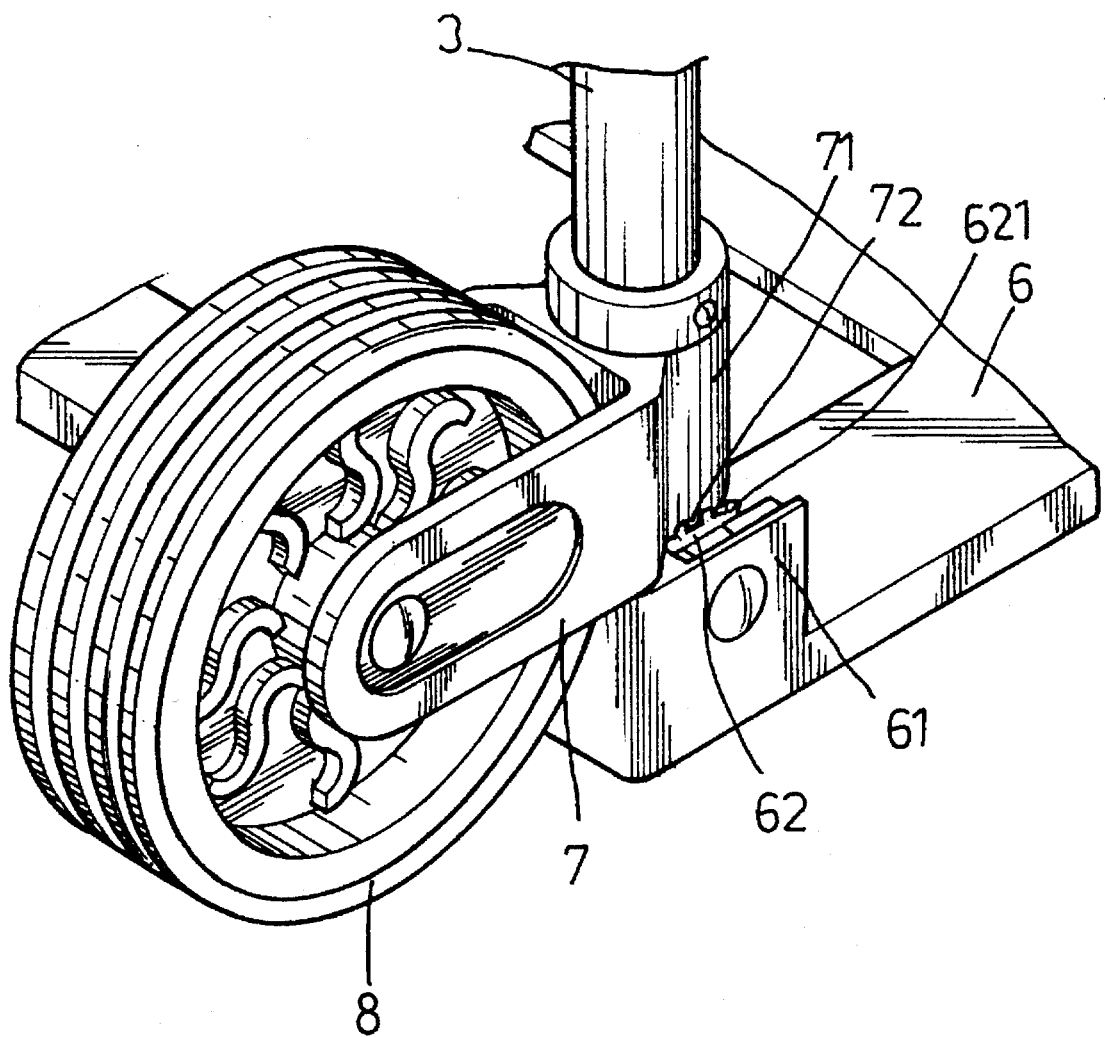
FIG. 3 is a perspective view of FIG. 2 in expending position.
Figure 4:
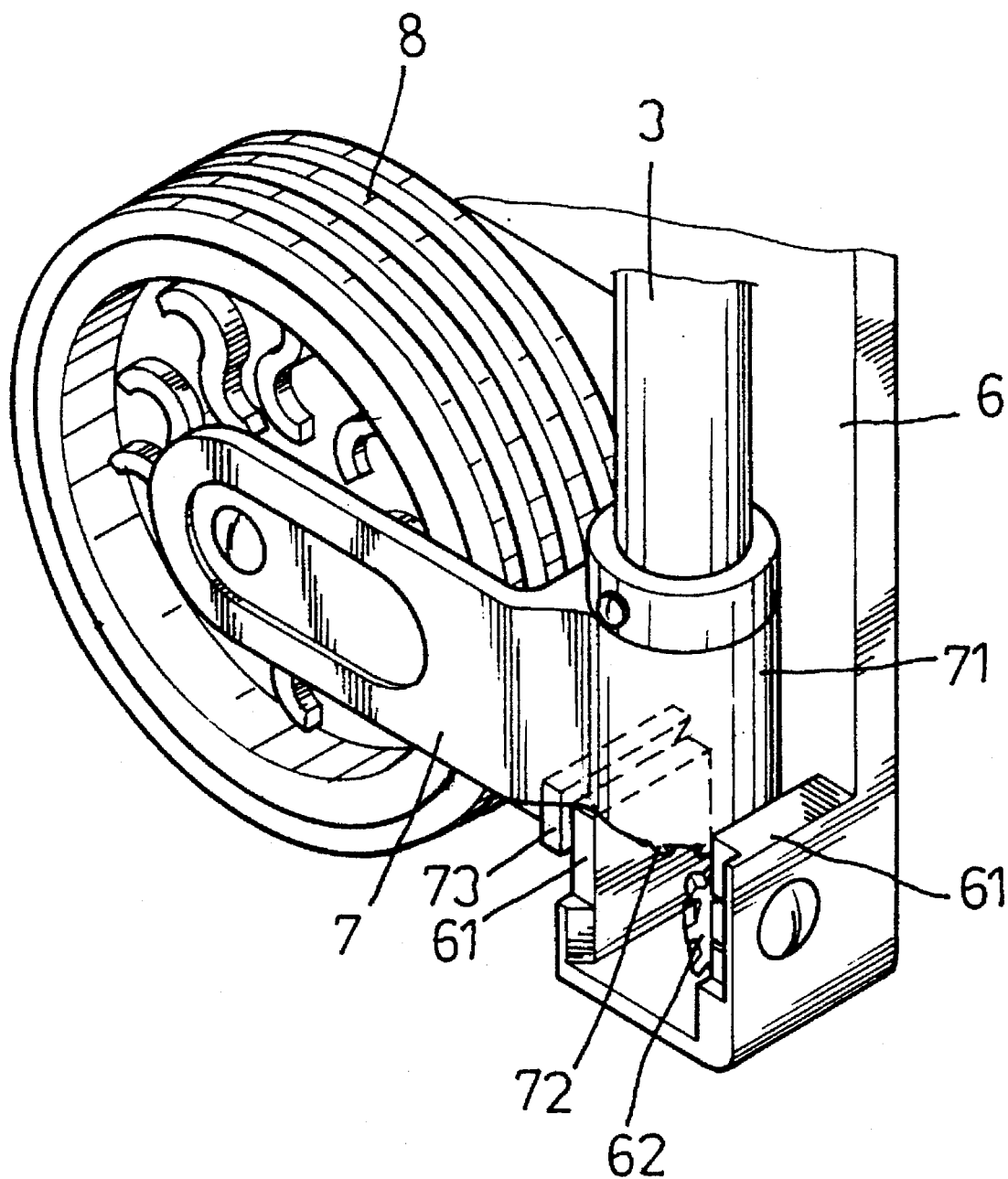
FIG. 4 is a further view of FIG. 3 in folding position and having partially sectioned.
Figure 5B:
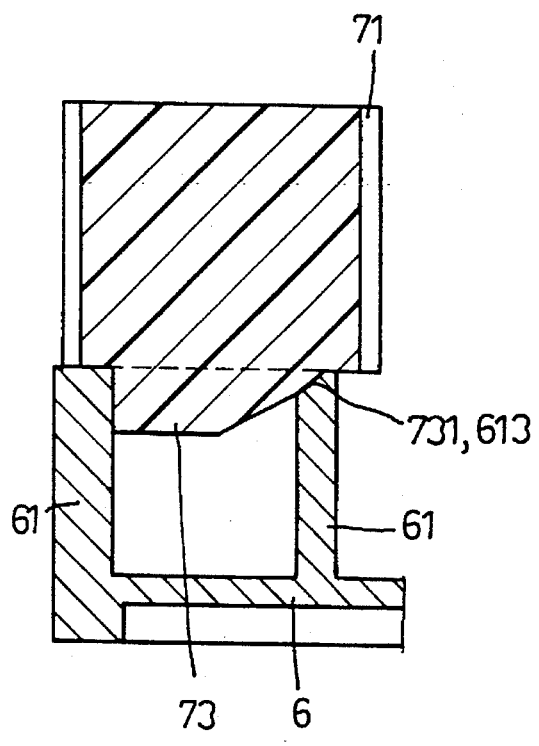
FIG. 5B is a cross sectional view along line 1—1 of FIG. 5A.
Figure 5A:
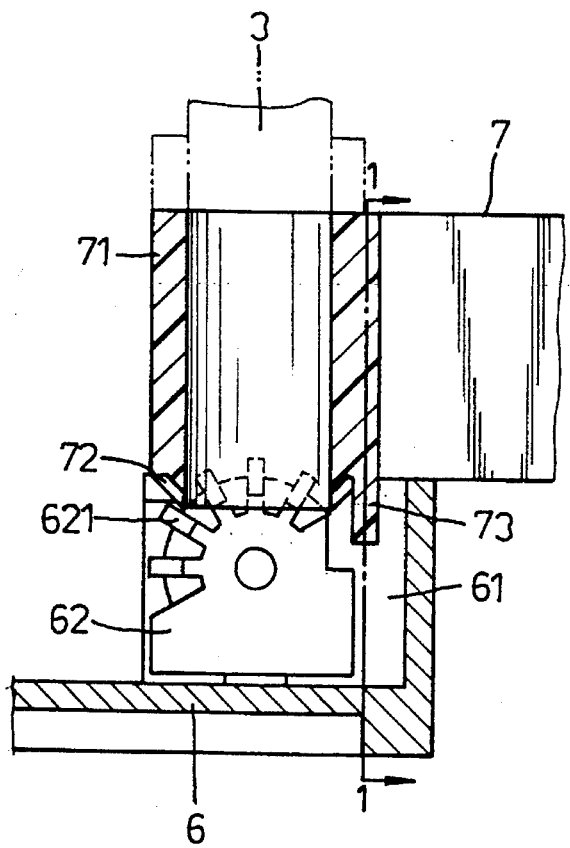
FIG. 5 is a sectional view of FIG. 3.

To assemble the present invention, insert the guiding blocks 62 into the fixturing housings 61 with each boss 623 sliding in one recess 612. Place the wheel frames 7 on top of the fixturing housings 61 with the crown gear 72 of each wheel frame 7 meshing with each set of conical gear teeth 621 of the guiding block 62. Insert the legs 3 into the sleeve 71 and push the legs 3 all the way down so that an aperture on each leg 3 will align with the apertures 622 and 611. A pair of rivets are used to secure the guiding blocks 62 and the legs 3 in the fixturing housings 61, as shown in FIG. 3. When the loading platform 6 is at its extended position, the slanted flanks 731 engage with the bulge portions 613 in order to hold the loading platform 6 in place, as shown in FIGS. 5A and 5B. When the loading platform 6 is folded upwardly, the fixturing housings 61 will move along with the loading platform 6 that allows the wheel frames 7 to turn inwardly passing the inner wall of the housings 61, as shown in FIG. 4.

Figure 6:
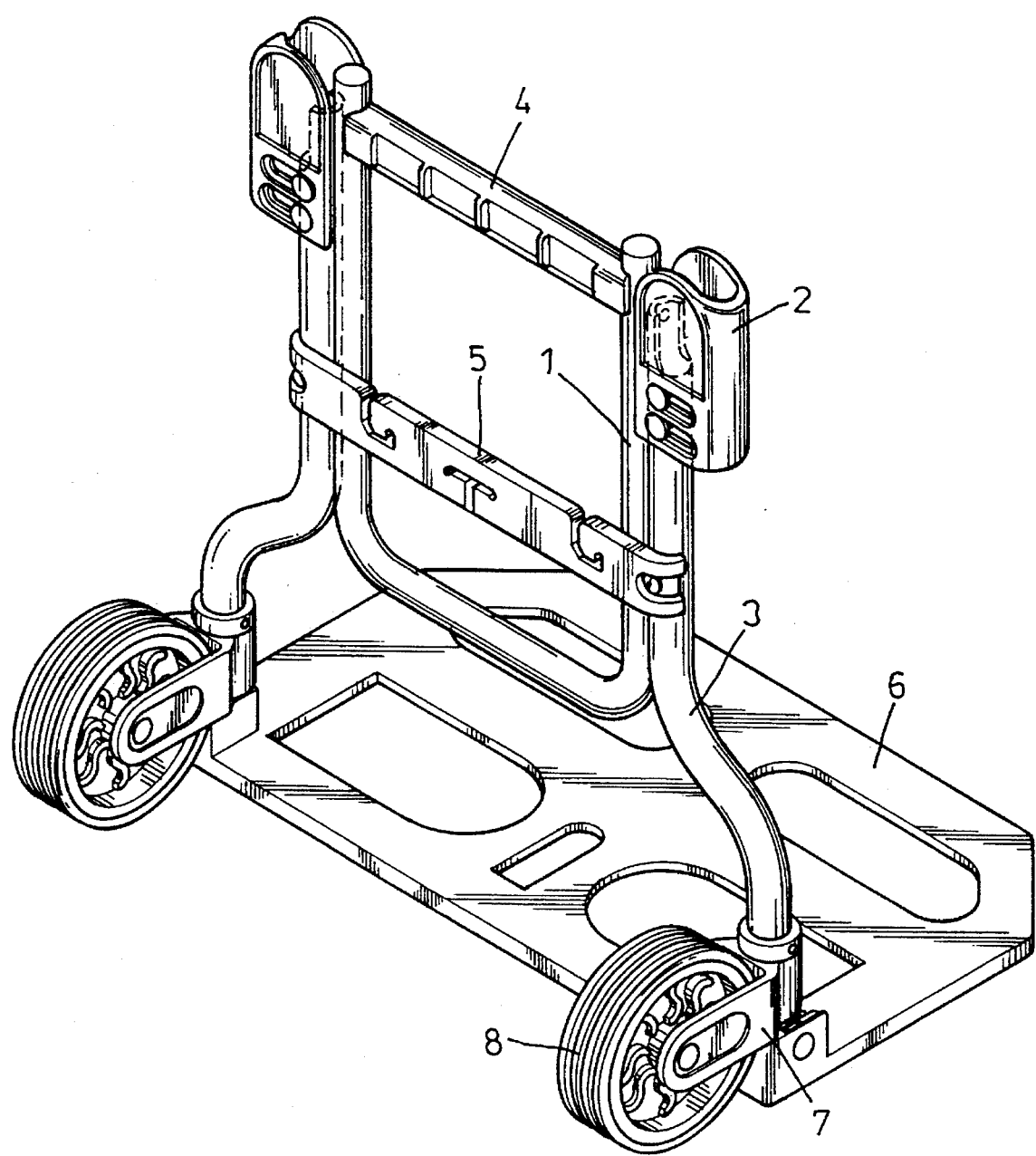
FIG. 6 is another perspective view of FIG. 1 having the handle in a folding position.
Figure 7:
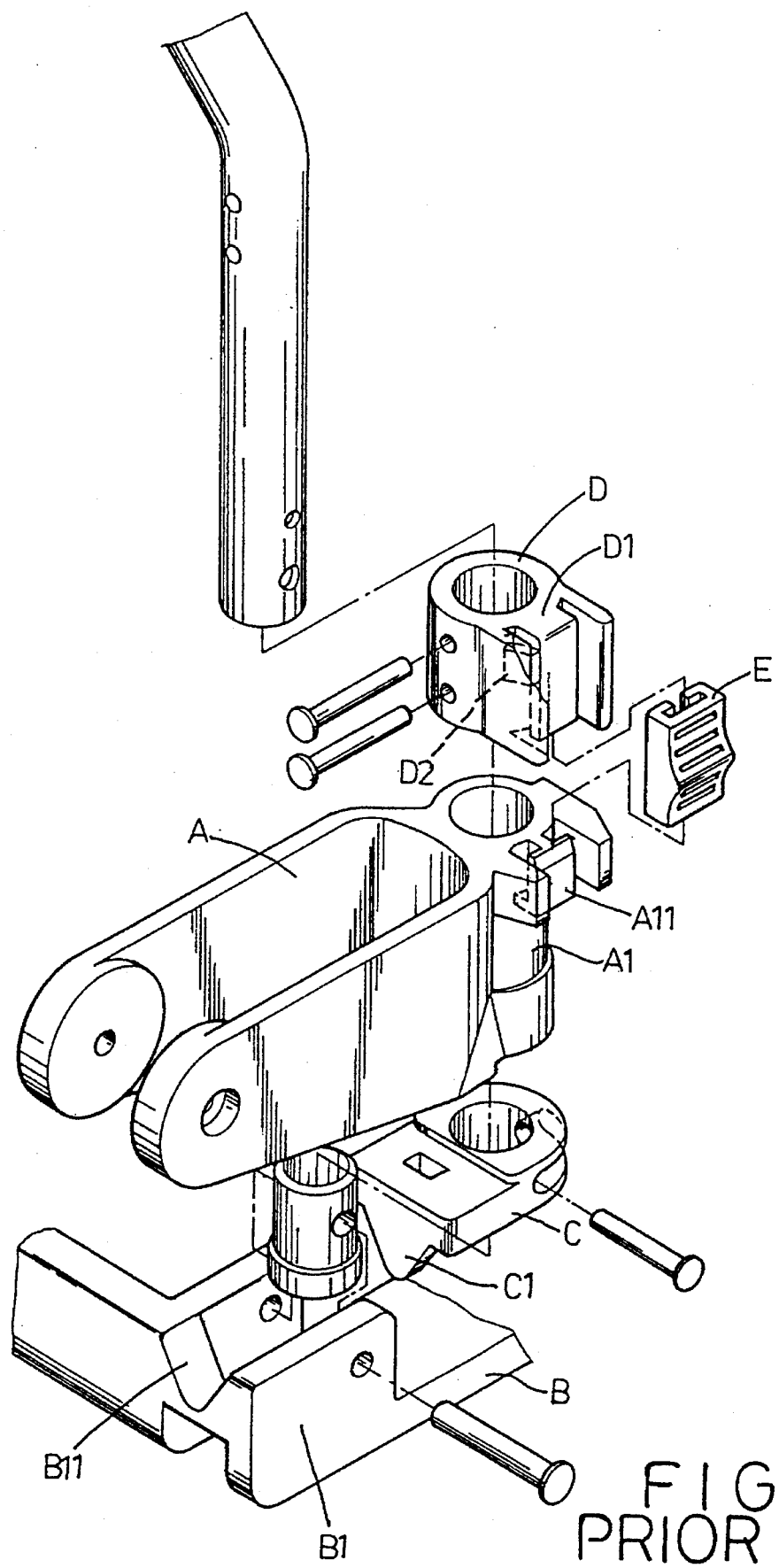
FIG. 7 is an exploded view of a wheel frame and a loading platform of a prior art.
Figure 8:
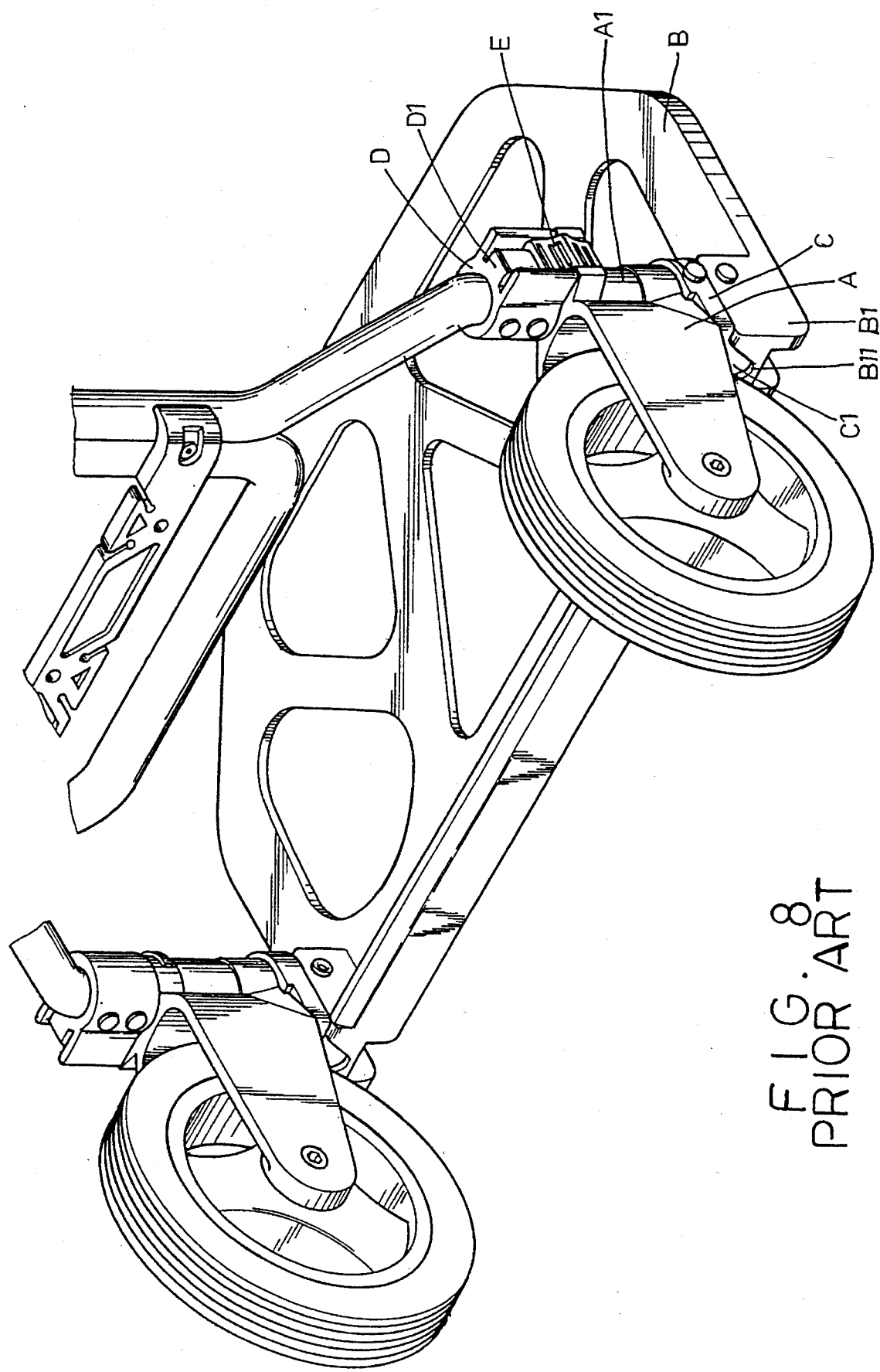
FIG. 8 is a perspective view of FIG. 7.

The handle 1 may also be folded downwardly by pulling the U-shaped members 2 outwardly, pulling the handle 1 down and then pushing the U-shaped members 2 back again to their original positions, as shown in FIG. 6.

I claim:

1. A foldable cart comprising a handle having two ends turned 90 degrees downwardly and pivotally connected to a pair of legs, a pair of U-shaped members at said pivotal connection of said handle and said legs, a pair of wheel frames and a loading platform being secured to the bottom portions of said legs, and the improvement comprising:

said loading platform having a pair of fixturing housings at respective rear corners and a pair of guiding blocks secured in said fixturing housings, each of said fixturing housings having an aperture formed through an outer wall thereof, a rectangular recess formed in an inside surface of said outer wall and a bulge portion formed at top portion of an inner wall thereof, each said guiding block having conical gear teeth formed on a top portion thereof, a boss at one side disposed within said rectangular recess and having an aperture formed concentric with said guiding block and disposed in alignment with said aperture of said fixturing housing, each said wheel frame having a sleeve formed at a rear end portion thereof, said sleeve having an inner diameter slightly larger than an outer diameter of each said leg, a crown gear being integrally formed at a bottom portion of each said sleeve to be meshingly engaged with said conical gear teeth of a respective guiding block, a block being integrally formed on a bottom portion of each said wheel frame having a slanted flank disposed in engaged relationship with said bulge portion of said fixturing housing when said loading platform is in an extended position.

\* \* \* \* \*